US012656714B2

(12) United States Patent
Miyakai et al.

(10) Patent No.: US 12,656,714 B2
(45) Date of Patent: Jun. 16, 2026

(54) ELECTROPHOTOGRAPHIC MEMBER WITH SURFACE LAYER COMPRISING TETRAFLUOROETHYLENE-PERFLUOROALKYL VINYL ETHER COPOLYMER, AND FIXING DEVICE, AND ELECTROPHOTOGRAPHIC IMAGE FORMING APPARATUS INCLUDING ELECTROPHOTOGRAPHIC MEMBER

(71) Applicant: CANON KABUSHIKI KAISHA, Tokyo (JP)

(72) Inventors: Tomoyo Miyakai, Tokyo (JP); Kosuke Tanaka, Chiba (JP); Ryunosuke Kawahara, Ibaraki (JP); Akeshi Asaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/023,762

(22) Filed: Jan. 16, 2025

(65) Prior Publication Data

US 2025/0251682 A1 Aug. 7, 2025

(30) Foreign Application Priority Data

Feb. 2, 2024 (JP) ................................ 2024-014989

(51) Int. Cl.
*G03G 15/20* (2006.01)
*C08F 14/26* (2006.01)

(52) U.S. Cl.
CPC ......... *G03G 15/2057* (2013.01); *C08F 14/26* (2013.01); *G03G 15/2064* (2013.01)

(58) Field of Classification Search
CPC ........... G03G 15/2057; G03G 15/2064; G03G 2215/2035; G03G 2215/2048; C08F 14/26
See application file for complete search history.

(56) References Cited

U.S. PATENT DOCUMENTS 9,164,450 B2 10/2015 Matsumoto et al.
9,927,747 B2 3/2018 Kuboyama et al.
(Continued)

FOREIGN PATENT DOCUMENTS

EP 4 517 437 A1 3/2025
JP 2007-322751 A 12/2007
JP 2018-169530 A 11/2018

OTHER PUBLICATIONS

Extended European Search Report in European Application No. 25153502.7 (May 2025).

*Primary Examiner* — Hoang X Ngo
(74) *Attorney, Agent, or Firm* — VENABLE LLP

(57) ABSTRACT

An electrophotographic member comprising a base layer, an elastic layer on an outer peripheral surface of the base layer, and a surface layer on an outer peripheral surface of the elastic layer, wherein the surface layer comprises a tetrafluoroethylene-perfluoroalkyl vinyl ether copolymer, a plurality of crystals of the tetrafluoroethylene-perfluoroalkyl vinyl ether copolymer having different circle-equivalent diameters is exposed on an outer surface of the surface layer, at least a part of an outer surface of the electrophotographic member is composed of a surface of the crystals and is roughened by the crystals, when an arithmetic-mean height Sa of each observation region in a specific region of the outer surface is determined, the electrophotographic member satisfies a specific relationship in a frequency distribution of the observation regions in which the arithmetic-mean height Sa is taken as a class and a class width is 0.05 μm.

10 Claims, 2 Drawing Sheets

(56) References Cited

U.S. PATENT DOCUMENTS

| | | | |
|---|---|---|---|
| 10,139,760 B2 | 11/2018 | Mukoyama et al. | |
| 10,859,955 B2 | 12/2020 | Asaka et al. | |
| 12,070,925 B2 * | 8/2024 | Muramatsu | B32B 27/304 |
| 2016/0363890 A1 | 12/2016 | Kuboyama et al. | |
| 2020/0117127 A1 * | 4/2020 | Abe | G03G 15/206 |
| 2020/0333737 A1 * | 10/2020 | Maeda | C08K 3/22 |
| 2025/0004406 A1 | 1/2025 | Muramatsu et al. | |

* cited by examiner

ELECTROPHOTOGRAPHIC MEMBER WITH SURFACE LAYER COMPRISING TETRAFLUOROETHYLENE-PERFLUOROALKYL VINYL ETHER COPOLYMER, AND FIXING DEVICE, AND ELECTROPHOTOGRAPHIC IMAGE FORMING APPARATUS INCLUDING ELECTROPHOTOGRAPHIC MEMBER

BACKGROUND OF THE INVENTION

Field of the Invention

The present disclosure relates to an electrophotographic member for use in a fixing device of an electrophotographic image forming apparatus, and also to a fixing device and an electrophotographic image forming apparatus.

Description of the Related Art

A fixing member used in a fixing device of an electrophotographic image forming apparatus such as a printer, a copier, and a facsimile is available in the form of a film or a roller. A fixing member is known in which an elastic layer or a surface layer made of heat-resistant rubber or the like is formed, as necessary, on a film- or roller-shaped base material made of heat-resistant resin or metal. For example, a fluororesin or the like having release property is used for the surface layer. In the surface layer, a tetrafluoroethylene-perfluoroalkyl vinyl ether copolymer (PFA) is preferably used as a fluororesin having excellent release property relative to toner.

In recent years, there has been a demand for additional performance improvements in electrophotographic image forming apparatuses, such as faster print speeds, higher image quality, energy-saving performance, and compatibility with a wide variety of media. For example, for a case where an electrophotographic member is used as a fixing member, techniques for further improving the release property of the fixing member relative to toner has been studied in order to accommodate a wide range of fixing conditions.

Japanese Patent Application Publication No. 2018-169530 discloses a technique for improving non-adhesiveness of a release layer in a fixing belt having a base layer made of a heat-resistant resin, an elastic layer made of an elastic material disposed on the base layer, and a release layer made of a fluorine resin disposed on the elastic layer, with a specific uneven shape being formed on the release layer.

SUMMARY OF THE INVENTION

By forming an uneven shape on the outer surface of the fixing belt, as in Japanese Patent Application Publication No. 2018-169530, the release property of the surface layer relative to toner can be improved. However, the research conducted by the inventors has shown that when such a fixing belt is used as a fixing member, the recording medium becomes slippery when the toner is fixed, and the toner melts and spreads in a paper passage direction, which may result in a decrease in image quality, such as thickening of thin lines. This is thought to be due to a feature in which the uneven shape of the outer surface of the fixing belt reduces an actual contact area with the recording medium and reduces a friction coefficient.

In addition, when a mechanical processing method such as surface transfer or blasting is used to form the uneven shape, the uneven shape may be lost due to the heat and pressure during heat fixing over the course of use, and the release property relative to toner may decrease.

At least one aspect of the present disclosure is directed to providing an electrophotographic member that makes it possible to obtain excellent release property relative to toner and favorable image quality over long-term use. In addition, at least one aspect of the present disclosure is directed to providing a fixing device that contributes to the stable formation of high-quality electrophotographic images. Furthermore, at least one aspect of the present disclosure is directed to providing an electrophotographic image forming apparatus that can stably form high-quality electrophotographic images.

At least one aspect of the present disclosure provides an electrophotographic member comprising a base layer, an elastic layer on an outer peripheral surface of the base layer, and a surface layer on an outer peripheral surface of the elastic layer, wherein the surface layer comprises a tetrafluoroethylene-perfluoroalkyl vinyl ether copolymer, a plurality of crystals of the tetrafluoroethylene-perfluoroalkyl vinyl ether copolymer having different circle-equivalent diameters is exposed on an outer surface of the surface layer, at least a part of an outer surface of the electrophotographic member is composed of a surface of the crystals and is roughened by the crystals, when a rectangular region having a length of 5 mm in a direction along a circumferential direction of the electrophotographic member and a length of 10 mm in a longitudinal direction perpendicular to the circumferential direction is arranged on the outer surface of the electrophotographic member so that a center of the rectangular region in the longitudinal direction coincides with a center of the electrophotographic member in the longitudinal direction, the rectangular region is divided into 200 observation regions by squares with sides of 500 μm, and an arithmetic-mean height Sa of each observation region is determined, in a frequency distribution of the observation regions in which the arithmetic-mean height Sa is taken as a class and a class width is 0.05 μm, where the number of the observation regions comprised in an observation region group X1 belonging to a class where the arithmetic-mean height Sa is 0.10 to 0.40 μm is denoted by x1, x1 satisfies $160 \le x1 \le 200$, and where the number of the observation regions comprised in an observation region group X2 belonging to a class where the arithmetic-mean height Sa is 0.10 to 0.20 μm is denoted by x2, and the number of the observation regions comprised in an observation region group X3 belonging to a class where the arithmetic-mean height Sa is 0.25 to 0.40 μm is denoted by x3, x1 and x2 satisfy a following formula (1), and x1 and x3 satisfy a following formula (2):

$$0.25 \cdot x1 \le x2 \le 0.75 \cdot x1 \quad (1)$$

$$0.25 \cdot x1 \le x3 \le 0.75 \cdot x1. \quad (2)$$

At least one aspect of the present disclosure provides a fixing device in an electrophotographic image forming apparatus, wherein the fixing device comprises a fixing member and a pressure member arranged opposite the fixing member, and at least one of the fixing member and the pressure member is the electrophotographic member of the present disclosure.

At least one aspect of the present disclosure provides an electrophotographic image forming apparatus comprising a fixing device, wherein the fixing device comprises a fixing member and a pressure member arranged opposite the fixing member, and at least one of the fixing member and the pressure member is the electrophotographic member of the present disclosure.

According to at least one aspect of the present disclosure, an electrophotographic member that makes it possible to obtain excellent release property relative to toner and favorable image quality over long-term use can be obtained. In addition, according to at least one aspect of the present disclosure, a fixing device that contributes to the stable formation of high-quality electrophotographic images can be obtained. Furthermore, according to at least one aspect of the present disclosure, an electrophotographic image forming apparatus that can stably form high-quality electrophotographic images can be obtained. Further features of the present invention will become apparent from the following description of exemplary embodiments with reference to the attached drawings.

DESCRIPTION OF THE EMBODIMENTS

Figure 1:
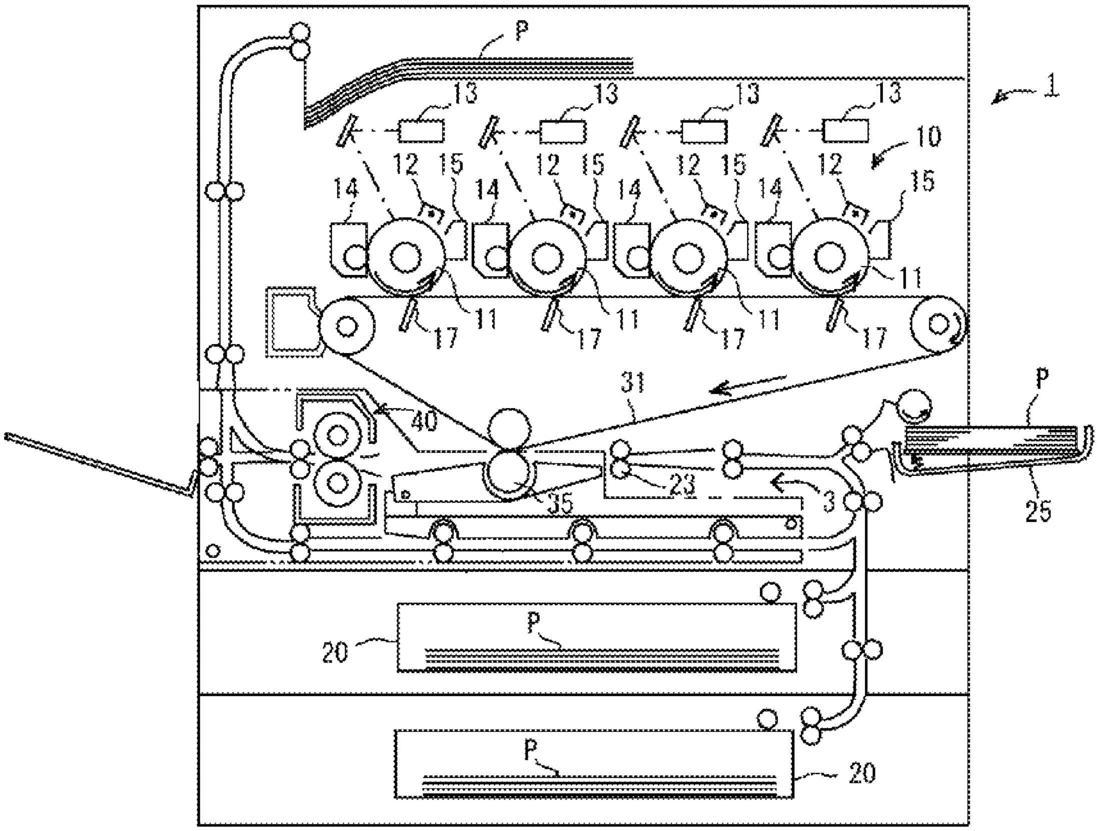
FIG. 1 is a schematic view of an image forming apparatus.

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

The embodiments of the present disclosure are described hereinbelow in detail. The technical scope of the present disclosure is not limited to the following description.

The present disclosure relates to an electrophotographic member comprising a base layer, an elastic layer on an outer peripheral surface of the base layer, and a surface layer on an outer peripheral surface of the elastic layer, wherein the surface layer comprises a tetrafluoroethylene-perfluoroalkyl vinyl ether copolymer, a plurality of crystals of the tetrafluoroethylene-perfluoroalkyl vinyl ether copolymer having different circle-equivalent diameters is exposed on an outer surface of the surface layer, at least a part of an outer surface of the electrophotographic member is composed of a surface of the crystals and is roughened by the crystals, when a rectangular region having a length of 5 mm in a direction along a circumferential direction of the electrophotographic member and a length of 10 mm in a longitudinal direction perpendicular to the circumferential direction is arranged on the outer surface of the electrophotographic member so that a center of the rectangular region in the longitudinal direction coincides with a center of the electrophotographic member in the longitudinal direction, the rectangular region is divided into 200 observation regions by squares with sides of 500 μm, and an arithmetic-mean height Sa of each observation region is determined, in a frequency distribution of the observation regions in which the arithmetic-mean height Sa is taken as a class and a class width is 0.05 μm, where the number of the observation regions comprised in an observation region group X1 belonging to a class where the arithmetic-mean height Sa is 0.10 to 0.40 μm is denoted by x1, x1 satisfies 160≤x1≤200, and where the number of the observation regions comprised in an observation region group X2 belonging to a class where the arithmetic-mean height Sa is 0.10 to 0.20 μm is denoted by x2, and the number of the observation regions comprised in an observation region group X3 belonging to a class where the arithmetic-mean height Sa is 0.25 to 0.40 μm is denoted by x3, x1 and x2 satisfy a following formula (1), and x1 and x3 satisfy a following formula (2):

$$0.25 \cdot x1 \leq x2 \leq 0.75 \cdot x1 \tag{1}$$

$$0.25 \cdot x1 \leq x3 \leq 0.75 \cdot x1. \tag{2}$$

Electrophotographic Member

The electrophotographic member according to at least one aspect of the present disclosure is, for example, a fixing member. For example, the electrophotographic member is a fixing belt. Furthermore, the electrophotographic member may also be an electrophotographic belt having an endless shape. The electrophotographic member has a base layer, an elastic layer, and a surface layer, in this order. That is, the electrophotographic member has a base layer, an elastic layer on the outer peripheral surface of the base layer, and a surface layer on the outer peripheral surface of the elastic layer. Other layers may be provided, as necessary, between the base layer, the elastic layer, and the surface layer, and on the inner peripheral surface side of the base layer and the outer peripheral surface side of the surface layer.

Figure 2:
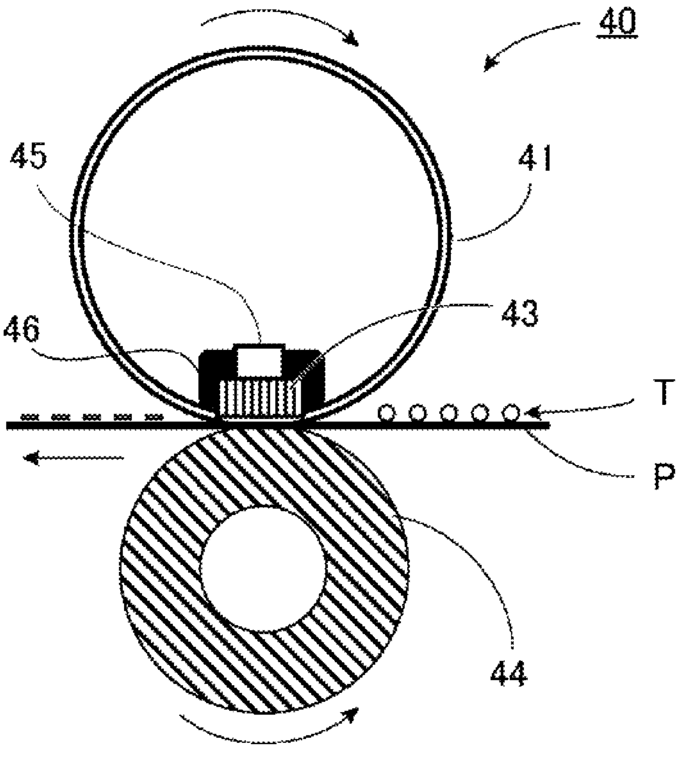
FIG. 2 is a schematic view of a fixing device.
Figure 3:
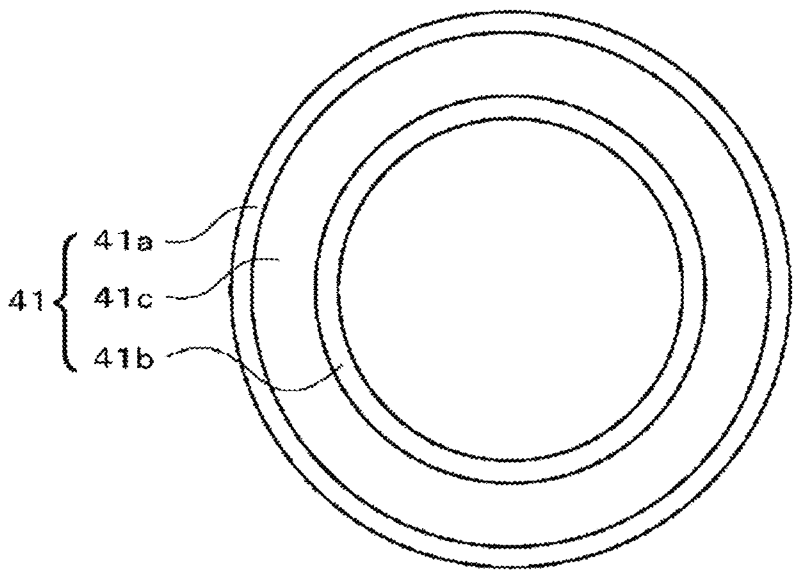
FIG. 3 is a schematic view of a fixing film.

The fixing member is, for example, a fixing film 41, as shown in FIGS. 2 and 3. The fixing member has a base layer 41*b*, an elastic layer 41*c*, and a surface layer 41*a*. The surface layer 41*a* can be, for example, a release layer having release property relative to toner or the like. The surface layer 41*a* can form the outer surface of the electrophotographic member. The surface layer 41*a* may be bonded to the surface of the elastic layer 41*c* with an adhesive layer (not shown). The inner peripheral surface side of the base layer 41*b* may be provided with an inner sliding layer (not shown).

Each layer will be specifically described below.

Base Layer

The material of the base layer 41*b* is not particularly limited, and well-known materials can be used. For example, metals and alloys such as aluminum, iron, stainless steel (SUS), and nickel, as well as heat-resistant resins such as polyimide can be used. Stainless steel is preferable. The thickness of the base layer 41*b* is not particularly limited, but is preferably from 20 μm to 100 μm, and more preferably from 20 μm to 50 μm, from the viewpoints of strength, flexibility, and heat capacity.

The outer surface of the base layer 41*b* may be surface-treated to impart adhesion to the elastic layer 41*c*. For the surface treatment, one or more of the following in combination may be used: physical treatment such as blasting, lapping, and polishing, and chemical treatment such as oxidation, coupling agent, and primer treatment.

When the elastic layer 41*c* containing silicone rubber is provided on the surface of the base layer 41*b*, it is preferable to perform a primer treatment on the surface of the base layer 41*b* in order to improve the adhesion between the base layer 41*b* and the elastic layer 41*c*. Examples of the primer used for the primer treatment include coating materials in which a silane coupling agent, a silicone polymer, a hydrogenated methylsiloxane, an alkoxysilane, a reaction accelerating catalyst, and a coloring agent such as red iron oxide are mixed and dispersed, as appropriate, in an organic solvent.

The primer may be selected, as appropriate, depending on the material of the base layer 41*b*, the type of the elastic layer 41*c*, or the form of the crosslinking reaction. In particular, when the elastic layer 41*c* contains a large amount of unsaturated aliphatic groups, a primer containing a hydrosilyl group is preferably used to impart adhesion by reaction with the unsaturated aliphatic groups. When the elastic layer 41*c* contains a large amount of hydrosilyl groups, a primer containing an unsaturated aliphatic group is preferably used.

Other examples of primers include those containing an alkoxy group. Commercially available primers can be used. The primer treatment includes a step of applying the primer to the outer surface of the base layer 41*b* (the surface to be bonded to the elastic layer 41*c*) and drying or baking.

Inner Surface Sliding Layer

The inner peripheral surface side of the base layer 41*b* may be provided with an inner surface sliding layer. A resin having both high durability and high heat resistance, such as polyimide resin, is suitable for the inner surface sliding layer. Since the inner surface sliding layer gradually wears away due to friction, it is preferable to provide a thickness that can be sufficient for the layer to function as a sliding layer throughout the duration of use. Meanwhile, a thickness that does not interfere with the supply of heat from the heater is preferable. Therefore, the thickness is preferably 5 μm to 20 μm, and more preferably 10 μm to 15 μm. The inner surface sliding layer may be formed using a known coating method.

Elastic Layer

The elastic layer 41*c* may be made of any known electrophotographic material and is not particularly limited. The elastic layer 41*c* preferably contains silicone rubber, which has excellent heat resistance. Furthermore, the raw material for the silicone rubber is preferably an addition-curable liquid silicone rubber. The elastic layer 41*c* may be formed, for example, by applying an addition-curable liquid silicone rubber to the outer surface of the base layer 41*b* and then heating and curing. There are no particular limitations on the application method, and a known method may be used.

The thickness of the elastic layer 41*c* can be designed, as appropriate, taking into consideration the surface hardness of the fixing member and the width of the fixing nip portion to be formed, and is preferably from 100 μm to 500 μm, and more preferably from 200 μm to 400 μm.

As the silicone rubber, for example, a cured product of an addition-curable type liquid silicone rubber composition described hereinbelow can be used. The elastic layer 41*c* can be formed by applying and heating the liquid silicone rubber composition by a known method.

The liquid silicone rubber composition usually contains the following components (a) to (d):

Component (a): organopolysiloxane having an unsaturated aliphatic group;

Component (b): organopolysiloxane having active hydrogen bonded to silicon;

Component (c): catalyst;

Component (d): thermally conductive filler

Each component will be explained hereinbelow.

Component (a)

The organopolysiloxane having an unsaturated aliphatic group is an organopolysiloxane having an unsaturated aliphatic group such as a vinyl group, and examples thereof include those shown in the following formulas (1) and (2). The organopolysiloxane having an unsaturated aliphatic group is preferably a linear chain type.

(1)

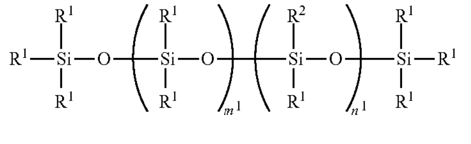

In formula (1), $m^1$ represents an integer of 0 or more, and $n^1$ represents an integer of 3 or more. In addition, in structural formula (1), each $R^1$ independently represents a monovalent unsubstituted or substituted hydrocarbon group that does not contain an unsaturated aliphatic group, provided that at least one of the $R^1$ groups represents a methyl group, and each $R^2$ independently represents an unsaturated aliphatic group.

(2)

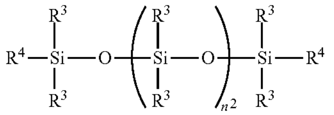

In formula (2), $n^2$ represents a positive integer, and each $R^3$ independently represents a monovalent unsubstituted or substituted hydrocarbon group that does not contain an unsaturated aliphatic group, provided that at least one of the $R^3$ groups represents a methyl group, and each $R^4$ independently represents an unsaturated aliphatic group.

Examples of the monovalent unsubstituted or substituted hydrocarbon group that does not contain an unsaturated aliphatic group and that can be represented by $R^1$ and $R^3$ in formulas (1) and (2) include the following groups.

Unsubstituted Hydrocarbon Group

Alkyl group (e.g., methyl group, ethyl group, propyl group, butyl group, pentyl group, and hexyl group).

Aryl group (e.g., phenyl group).

Substituted Hydrocarbon Group

Substituted alkyl group (e.g., chloromethyl group, 3-chloropropyl group, 3,3,3-trifluoropropyl group, 3-cyanopropyl group, and 3-methoxypropyl group).

The organopolysiloxanes represented by formulas (1) and (2) have at least one methyl group directly bonded to the silicon atom forming the chain structure. However, for ease of synthesis and handling, it is preferable that 50% or more of each of $R^1$ and $R^3$ be methyl groups, and it is more preferable that all $R^1$ and $R^3$ be methyl groups.

In addition, examples of unsaturated aliphatic groups that can be represented by $R^2$ and $R^4$ in formulas (1) and (2) include the following groups. That is, examples of unsaturated aliphatic groups include vinyl group, allyl group, 3-butenyl group, 4-pentenyl group, and 5-hexenyl group. Of these groups, it is preferable that both $R^2$ and $R^4$ be vinyl group, because synthesis and handling are easy, the cost is low, and crosslinking reactions are easily carried out.

From the viewpoint of moldability, it is preferable that the viscosity of component (a) be from 1000 $mm^2/s$ to 50,000 $mm^2/s$. If the viscosity is less than 1000 $mm^2/s$, it becomes difficult to adjust the hardness required for the elastic layer 20$c$, and if the viscosity is more than 50,000 $mm^2/s$, the viscosity of the composition becomes too high and coating becomes difficult. The viscosity (kinetic viscosity) can be measured using a capillary viscometer or a rotational viscometer based on JIS Z 8803:2011.

The amount of component (a) is preferably 55% by volume or more from the viewpoint of durability and 65% by volume or less from the viewpoint of heat transfer, based on the liquid silicone rubber composition used to form the elastic layer 20$c$.

Component (b)

An organopolysiloxane having active hydrogen bonded to silicon reacts with the unsaturated aliphatic group of component (a) by the action of a catalyst, and functions as a crosslinking agent to form a cured silicone rubber.

As component (b), any organopolysiloxane having a Si—H bond can be used. In particular, from the viewpoint of reactivity with the unsaturated aliphatic group of component (a), an organopolysiloxane having an average of 3 or more hydrogen atoms bonded to silicon atoms in one molecule are preferably used.

Specific examples of component (b) include linear organopolysiloxanes shown in the following formula (3) and cyclic organopolysiloxanes shown in the following formula (4).

(3)

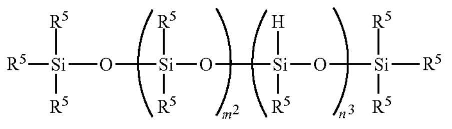

In formula (3), $m^2$ represents an integer of 0 or more, $n^3$ represents an integer of 3 or more, and each $R^5$ independently represents a monovalent unsubstituted or substituted hydrocarbon group not containing an unsaturated aliphatic group.

(4)

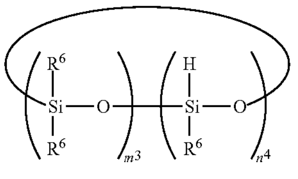

In formula (4), $m^3$ represents an integer of 0 or more, $n^4$ represents an integer of 3 or more, and each $R^6$ independently represents a monovalent unsubstituted or substituted hydrocarbon group not containing an unsaturated aliphatic group.

$R^5$ and $R^6$ in formulas (3) and (4) can represent monovalent unsubstituted or substituted hydrocarbon groups not containing unsaturated aliphatic groups, and examples of such groups include the same groups as $R^1$ in structural formula (1) described above. Among these, it is preferable that 50% or more of $R^5$ and $R^6$ be methyl groups, and it is more preferable that all $R^5$ and $R^6$ be methyl groups, because such organopolysiloxanes are easy to synthesize and handle, and excellent heat resistance can be easily obtained.

Component (c)

As a catalyst used in forming silicone rubber, for example, a hydrosilylation catalyst for accelerating the curing reaction can be mentioned. As a hydrosilylation catalyst, for example, a known substance such as a platinum compound or a rhodium compound can be used. The amount of catalyst to be added can be set as appropriate and is not particularly limited.

Component (d)

The elastic layer 41$c$ may contain a filler. The filler is added to control the thermal conductivity, heat resistance, and elastic modulus. Examples of thermally conductive fillers include metals, metal compounds, and carbon fibers. Highly thermally conductive fillers are more preferred, and specific examples thereof include the following materials:

Silicon metal (Si), silicon carbide (SiC), silicon nitride ($Si_3N_4$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), silica ($SiO_2$), copper (Cu), aluminum (Al), silver (Ag), iron (Fe), nickel (Ni), carbon black (C), carbon nanotubes (C), vapor-grown carbon fiber, PAN-based (polyacrylonitrile) carbon fiber, and pitch-based carbon fiber.

Adhesive Layer

The electrophotographic member may have an adhesive layer between the elastic layer 41$c$ and the surface layer 41$a$. By having the adhesive layer, it becomes easier to bond the elastic layer and the surface layer. The material of the adhesive layer is not particularly limited, and a known material may be used. For example, the adhesive layer preferably contains a cured product of an adhesive. The adhesive may be a solution-type adhesive or a hot-melt adhesive.

The adhesive is not particularly limited, and a known adhesive may be used, but it is preferable to use a silicone rubber adhesive.

The thickness of the adhesive layer is not particularly limited, but is preferably 1 μm to 20 μm, and more preferably 3 μm to 10 μm.

Surface Layer

The surface layer 41$a$ contains tetrafluoroethylene-perfluoroalkyl vinyl ether copolymer (PFA). The surface layer 41$a$ preferably consists of PFA.

PFA is a copolymer of perfluoroalkyl vinyl ether (PAVE) and tetrafluoroethylene (TFE). Means for forming the surface layer 41$a$ containing PFA can be exemplified by a method in which a dispersion liquid (water-based dispersion coating material) or powder coating material mainly composed of PFA is applied to the surface of the elastic layer 41$c$, and the coating is heated to above the melting point to form a film. Alternatively, a method can be used in which a PFA tube manufactured by extrusion molding is separately applied to cover the surface of the elastic layer 41$c$. The surface layer 41$a$ is, for example, a PFA tube.

There are no particular limitations on the PFA, and a known material can be used. Commercially available PFA may be used. Specific examples include AP-230 (product name, manufactured by Daikin Industries, Ltd.) and AP-231SH (product name, manufactured by Daikin Industries, Ltd.).

The fact that the material is PFA can be confirmed, for example, by checking the FT-IR ATR spectrum for the presence of peaks characteristic of polytetrafluoroethylene (PTFE) as well as the presence of a small peak near 994 $cm^{-1}$ that does not appear in PTFE.

First, peaks characteristic of PTFE include 1200 $cm^{-1}$ ($CF_2$ antisymmetric stretching), 1150 $cm^{-1}$ ($CF_2$ symmetric stretching), 640 $cm^{-1}$ ($CF_2$ out-of-plane bending (wagging)), 555 $cm^{-1}$ ($CF_2$ in-plane bending (scissors)), and 505 $cm^{-1}$ ($CF_2$ in-plane bending (rocking)). The position of the peak near 994 $cm^{-1}$, which is characteristic of PFA, changes depending on the length of the carbon chain in the perfluoroalkyl vinyl ether portion. In the case of a perfluoropropoxy group, the peak appears at 994 $cm^{-1}$, in the case of a perfluoroethoxy group, the peak appears at 1090 $cm^{-1}$, and in the case of a perfluoromethoxy group, the peak appears at 881 $cm^{-1}$.

When a rectangular region having a length of 5 mm in a direction along a circumferential direction of the electrophotographic member and a length of 10 mm in a longitudinal direction perpendicular to the circumferential direction is arranged on the outer surface of the electrophotographic member so that the center of the rectangular region in the longitudinal direction coincides with the center of the electrophotographic member in the longitudinal direction, the rectangular region is divided into 200 observation regions by squares with sides of 500 μm, and an arithmetic-mean height Sa of each observation region is determined, in a frequency distribution of the observation regions in which the arithmetic-mean height Sa is taken as a class and a class width is 0.05 μm, where the number of the observation regions included in an observation region group X1 belonging to a class where the arithmetic-mean height Sa is 0.10 μm to 0.40 μm is denoted by x1, x1 satisfies $160 \leq x1 \leq 200$. Furthermore, in the frequency distribution of the observation regions, where the number of the observation regions included in an observation region group X2 belonging to a class where the arithmetic-mean height Sa is 0.10 μm to 0.20 μm is denoted by x2, x1 and x2 satisfy the following formula (1). In addition, in the frequency distribution of the observation regions, where the number of the observation regions included in an observation region group X3 belonging to a class where the arithmetic-mean height Sa is 0.25 μm to 0.40 μm is denoted by x3, x1 and x3 satisfy the following formula (2). Here, in formulas (1) and (2), notation such as 0.25·x1 means multiplying 0.25 and x1. The same applies to formulas (3) to (6) below.

$$0.25 \cdot x1 \leq x2 \leq 0.75 \cdot x1 \quad (1)$$

$$0.25 \cdot x1 \leq x3 \leq 0.75 \cdot x1 \quad (2)$$

As a result of x1, x2, and x3 satisfying $160 \leq x1 \leq 200$ and the above formulas (1) and (2) in the rectangular region with a length of 5 mm in a direction along the circumferential direction and a length of 10 mm in the longitudinal direction perpendicular to the circumferential direction of an electrophotographic member, the regions with Sa of 0.10 μm to 0.40 μm will be sufficiently present, while the regions with different arithmetic-mean heights Sa will be present at a similar ratio in the nip portion during fixing as well. This makes it possible to suppress slippage of the recording medium and obtain good image quality while improving the release property relative to toner.

Specifically, in the regions where Sa is less than 0.10 μm, the surface uneven shape becomes too small, and the release property relative to toner is likely to decrease. Furthermore, in the regions where Sa exceeds 0.40 μm, the actual contact area with the recording medium becomes too small, making it difficult to suppress slippage of the recording medium.

Furthermore, in regions where Sa is 0.20 μm or less, the actual contact area with the recording medium becomes large and the coefficient of friction becomes large. Therefore, if there are many regions where Sa is 0.20 μm or less, it is easy to suppress slippage of the recording medium well. Meanwhile, in the regions where Sa is 0.25 μm or more, the surface uneven shape is large. Therefore, if there are many regions where Sa is 0.25 μm or more, it is easy to improve the release property relative to toner.

In other words, satisfying the above formula (1) indicates that the number of the observation regions included in an observation region group X2 belonging to a class where the arithmetic-mean height Sa is 0.10 μm to 0.20 μm is sufficient compared with the number of the observation regions included in an observation region group X1 belonging to a class where the arithmetic-mean height Sa is 0.10 μm to 0.40 μm. Furthermore, satisfying the above formula (2) indicates that the number of the observation regions included in an observation region group X3 belonging to a class where the arithmetic-mean height Sa is 0.25 μm to 0.40 μm is sufficient compared with the number of the observation regions included in an observation region group X1 belonging to a class where the arithmetic-mean height Sa is from 0.10 μm to 0.40 μm. Therefore, by satisfying both above formulas (1) and (2), it is possible to achieve both excellent release property relative to toner and good image quality.

In addition, in order to easily enhance the effect of improving the release property as described above, it is preferable that the number y1 of observation regions included in the observation region group Y1 belonging to a class where the arithmetic-mean height Sa is below 0.10 μm be less than 40. In order to improve the effect of suppressing slippage of the recording medium, it is preferable that the number y2 of observation regions included in the observation region group Y2 belonging to a class where the arithmetic-mean height Sa is greater than 0.40 μm be less than 40.

x1 preferably satisfies $180 \leq x1 \leq 200$. When x1 is in the above range, a larger number of regions with Sa of 0.10 μm to 0.40 μm is present, which makes it easier to improve the release property relative to toner, suppress slippage of the recording medium, and easily obtain good image quality.

x2 preferably satisfies $40 \leq x2 \leq 165$, more preferably satisfies $50 \leq x2 \leq 150$, even more preferably satisfies $60 \leq x2 \leq 140$, and particularly preferably satisfies $70 \leq x2 \leq 100$. When x2 is in the above range, it is easier to satisfy the above formula (1), the following formula (3), or the following formula (5).

x3 preferably satisfies $40 \leq x3 \leq 165$, more preferably satisfies $50 \leq x3 \leq 150$, even more preferably satisfies $60 \leq x3 \leq 140$, and particularly preferably satisfies $70 \leq x3 \leq 100$. When x3 is in the above range, it is easier to satisfy the above formula (2), the following formula (4), or the following formula (6).

The adjustment and measurement methods for x1, x2, and x3 will be described hereinbelow.

Moreover, it is more preferable that x1 and x2 satisfy the following formula (3), and x1 and x3 satisfy the following formula (4).

$$0.30\cdot x1 \le x2 \le 0.70\cdot x1 \quad (3)$$

$$0.30\cdot x1 \le x3 \le 0.70\cdot x1 \quad (4)$$

Where x1, x2, and x3 satisfy the above formulas (3) and (4), the release property relative to toner and the suppression of slippage of the recording medium are improved. It is more preferable that x1 and x2 satisfy the following formula (5), and x1 and x3 satisfy the following formula (6).

$$0.35\cdot x1 \le x2 \le 0.65\cdot x1 \quad (5)$$

$$0.35\cdot x1 \le x3 \le 0.65\cdot x1 \quad (6)$$

In addition, a plurality of crystals of PFA having different circle-equivalent diameters is exposed on an outer surface of the surface layer. The method described hereinbelow is used to confirm that the plurality of crystals have different circle-equivalent diameters.

Furthermore, at least a part of an outer surface of the electrophotographic member is composed of a surface of the crystals and is roughened by the crystals. As a result, a state in which the outer surface of the electrophotographic member is roughened can be maintained over a long period of use, and good release property relative to toner can be achieved while suppressing slippage of the recording medium, thereby obtaining good image quality. The shape of the PFA crystals is not particularly limited, and they may be, for example, spherulites.

The state roughened by crystals can be, for example, a state in which PFA crystals are formed on the outer surface and an uneven shape is formed along the crystal shape. Here, the larger the crystal diameter, the larger the uneven shape. The uneven shape formed along the crystal shape is difficult to flatten by the heat and pressure during fixing, and the uneven shape can be maintained over a long period of use. The method of roughening by crystals will be described hereinbelow.

The method of confirming that at least a part of the outer surface of the electrophotographic member is roughened by PFA crystals is described hereinbelow.

Two observation regions are extracted from each of the observation region groups X2 and X3, for a total of four extracted observation regions, and the arithmetic-mean height Sa and the area-average diameter of the crystals are calculated for each observation region using the method described hereinbelow. The correlation coefficient R between the Sa and the area-average diameter of each of the four observation regions is calculated, and when R is +0.90 or more, it is determined that the surface is roughened by crystals. In other words, the correlation coefficient R is +0.90 or more, preferably +0.95 or more, and more preferably +0.98 or more. There is no particular upper limit, and examples of preferred values include +0.90 to +1.00, +0.95 to +1.00, and +0.98 to +1.00. The correlation coefficient R can be adjusted by a method for controlling the area-average diameter of the PFA crystals on the outer surface of the electrophotographic member.

A method for exposing a plurality of PFA crystals having different circle-equivalent diameters on the outer surface of the surface layer and configuring at least a part of the outer surface of the electrophotographic member with the surface of the PFA crystals can be exemplified by a method in which, for example, in the production process of the electrophotographic member, the surface layer 41*a* is formed, then heated to a temperature equal to or higher than the melting point of PFA, and then cooled to crystallize the PFA and form crystals.

A specific method is not particularly limited, but the following methods of heat treatment of the surface layer can be used.

In order to heat the entire electrophotographic member after forming the surface layer, an upright cylindrical heating tube capable of heating up to, for example, 330° C. or higher is used. A band heater equipped with a thermocouple is installed inside the heating tube to control the heating temperature of the electrophotographic member. The heating temperature is preferably from the melting temperature of PFA to 350° C. The heating time may be any time that allows the temperature of the surface layer to reach the desired temperature sufficiently, and examples of the heating time include 1 min to 20 min, 1 min to 10 min, and 2 min to 5 min.

After the heating is completed, the cooling rate of the electrophotographic member is controlled by controlling the cooling rate of the heating tube. For example, the cooling rate can be controlled by providing an air supply nozzle on the outer periphery of the heating tube and adjusting the air flow rate. The faster the cooling rate in the crystallization temperature range of PFA, the smaller the crystal diameter of PFA. It is preferable to control the cooling rate until the temperature of the surface layer falls below the crystallization temperature range of PFA. The cooling rate may be within a range that allows the crystal diameter of PFA to be controlled to a desired size, and for example, is preferably 10° C./min to 60° C./min, more preferably 25° C./min to 60° C./min, even more preferably 35° C./min to 60° C./min, and particularly preferably 45° C./min to 60° C./min.

A method for setting x1, x2, and x3 within the above ranges can be exemplified by a method for controlling the area-average diameter of PFA crystals on the outer surface of the electrophotographic member. When the area-average diameter of PFA crystals is increased, the arithmetic-mean height Sa increases. Furthermore, when the area-average diameter of the PFA crystals is reduced, the arithmetic-mean height Sa is reduced. A method for controlling the area-average diameter of the PFA crystals is described hereinbelow.

It is believed that the area-average diameter of the PFA crystals is reduced as the frequency of crystal nuclei generation is increased relative to the crystal growth rate of the PFA. For example, when reducing the area-average diameter of the crystals on the outer surface, one method is to increase the cooling rate in the crystallization temperature range of PFA, as described above. In another method, a substance that serves as a nucleating agent for crystals is made present on the inner side of the surface layer 41*a*, that is, in the vicinity of the surface facing the elastic layer. This increases the frequency of crystal nuclei generation on the inner side.

Since crystals grow from the crystal nuclei and stop growing when coming into contact with other crystals, where the frequency of crystal nuclei generation is high, the diameter of the crystals formed on the inner side will be smaller. In the surface layer 41*a*, the smaller the diameter of the crystals formed on the inner side, the smaller the area-average diameter of the crystals on the outer surface will be. This is thought to be because the crystals first form on the inner surface, and then molecules attach to the surface thereof and crystallization proceeds toward the outer surface. Therefore, where the frequency of crystal nuclei generation is high on the inner surface, the area-average diameter of the crystals on the outer surface tends to be small. Conversely, where the frequency of crystal nuclei generation is low on the inner surface, the area-average diameter of the crystals on the outer surface tends to be large.

In order to make a substance that acts as a nucleating agent for crystals present on the inner side of the surface layer, for example, a method can be used in which a PFA tube is used to prepare the surface layer 41*a*, and the inner surface thereof is irradiated with excimer laser light under controlled irradiation conditions. In the excimer laser treatment, fluorine atoms on the surface on the inner side of the PFA tube are detached, and reactions such as carbonization and the generation of carbonyl groups due to reactions with oxygen occur. As a result, the element ratio on the surface on the inner side changes. The carbon generated by this becomes a nucleating agent, so this method can make the nucleating agent present on the inner side.

When an electrophotographic member is produced by a conventional method, the area-average diameter of crystals is uniform in each observation region when dividing into 200 observation regions by squares with sides of 500 μm, and the frequency distribution of Sa is narrow.

As a specific method for setting x1, x2, and x3 within the above ranges, the following method can be used. Here, an example is given in which a PFA tube is used to prepare the surface layer 41*a*, but the surface layer according to the present disclosure is not limited to being formed using a PFA tube.

The PFA tube can be prepared, for example, by extruding molten PFA from a cylindrical die. Such a PFA tube is rapidly cooled during the extrusion process, and crystallization progresses, so that the crystals are oriented in the extrusion direction. After the PFA tube is coated on the surface of the elastic layer 41*c* to form the surface layer 41*a*, the surface layer is heated to form crystals on the surface of the surface layer. At this time, it is preferable to control the crystal diameter by controlling the cooling rate in the crystallization temperature range of PFA.

The inner surface of the PFA tube can be subjected in advance to sodium treatment, excimer laser treatment, ammonia treatment, or the like to improve wettability and adhesion to the elastic layer 41*c* or an adhesive layer provided as necessary. It is preferable to treat the inner surface of the PFA tube using excimer laser treatment.

In the excimer laser treatment, it is preferable to attach a compound that absorbs ultraviolet light to the inner surface of the PFA tube, and then irradiate this compound with ultraviolet laser light such as KrF excimer laser light or ArF excimer laser light. Known compounds that absorb ultraviolet light can be used. For example, an aqueous solution is prepared by mixing a compound that absorbs ultraviolet light such as sodium benzoate with a known fluorine-based surfactant, and the aqueous solution is applied to the inner surface of the PFA tube and allowed to dry naturally.

In the excimer laser treatment, fluorine atoms on the surface on the inner side of the PFA tube are detached, and reactions such as carbonization and the generation of carbonyl groups due to reactions with oxygen occur. As a result, the element ratio on the surface on the inner side changes. The carbon generated by this becomes a nucleating agent, so this method can make the nucleating agent present on the inner side.

Here, it is preferable to control the irradiation conditions of the excimer laser light and control the carbonization of the inner surface of the PFA tube, thereby controlling the amount of carbon on the surface on the side of the surface layer facing the elastic layer. The irradiation conditions of the excimer laser light are usually selected from the viewpoint of improving wettability and adhesiveness, and the irradiation amount per shot or the number of shots is adjusted. In the present disclosure, it is preferable to create regions with a large number of shots and regions with a small number of shots by adjusting the overlapping of the excimer laser light, and to control the amount of carbon on the inner surface of the PFA tube for each region.

Furthermore, in a rectangular region of the inner surface of the PFA tube with a length of 5 mm in a direction along the circumferential direction and a length of 10 mm in the longitudinal direction perpendicular to the circumferential direction, it is preferable to control the area ratio of the region with a large number of shots to be from 35% to 65%, and more preferably to control it to be from 40% to 60%. In this rectangular region, it is preferable to control the area ratio of the region with a small number of shots to be from 35% to 65%, and more preferably to control it to be from 40% to 60%.

In the region with a large number of shots, the amount of carbon on the inner surface of the PFA tube is large, making it easier to reduce the area-average diameter of the PFA crystals on the outer surface of the surface layer. The number of shots is preferably 6 to 10, more preferably 6 to 8. In addition, in the region with a small number of shots, the amount of carbon on the inner surface of the PFA tube is small, and it is easy to increase the area-average diameter of the PFA spherulites on the outer surface of the surface layer. The number of shots is preferably 2 to 5, more preferably 2 to 4. In addition, the dose of the excimer laser light is preferably 100 $mJ/cm^2$/pulse to 600 $mJ/cm^2$/pulse, and more preferably 200 $mJ/cm^2$/pulse to 400 $mJ/cm^2$/pulse.

There is no particular restriction on the means for covering the PFA tube on the surface of the elastic layer, and known means can be used. For example, a method of expanding and covering a fluororesin tube from the outside (expansion and covering method) can be used. A vacuum expansion and covering method in which a PFA tube is vacuum expanded and covered from the outside can be used.

In at least one observation region among the observation regions included in the observation region group X2, the area-average diameter z2 of the crystals is preferably 10.0 μm to 25.0 μm, and more preferably 11.0 μm to 20.0 μm. Within these ranges, it becomes easier to set x2 in the above range. z2 can be adjusted by the above-mentioned method for adjusting the area-average diameter of the PFA crystals. A method for measuring z2 will be described hereinbelow.

In at least one observation region among the observation regions included in the observation region group X3, the area-average diameter z3 of the crystals is preferably 35.0 μm to 60.0 μm, and more preferably 40.0 μm to 50.0 μm. Within these ranges, it becomes easier to set x3 in the above range. z3 can be adjusted by the above-mentioned method for adjusting the area-average diameter of the PFA crystals. A method for measuring z3 will be described hereinbelow.

Furthermore, when an arithmetic-mean thickness of the surface layer of 200 observation regions is determined, a difference Δt between the maximum value of the arithmetic-mean thickness and the minimum value of the arithmetic-mean thickness is preferably 2.00 μm or less, and more preferably 1.20 μm or less. Within these ranges, the contact between each observation region and the recording medium is improved, and the release property relative to toner and the suppression of slippage of the recording medium are improved. The lower limit of Δt is not particularly limited, but preferable examples include 0.00 μm to 2.00 μm, 0.00 μm to 1.20 μm, and 0.40 μm to 1.20 μm. Δt can be adjusted by changing the thickness of the surface layer or by changing the cooling rate in the heat treatment of the surface layer. A method for measuring Δt will be described hereinbelow.

The thickness of the surface layer 41*a* is preferably 10 μm to 30 μm. Where the thickness is 30 μm or less, the effect of the nucleating agent on the inner surface side of the surface layer on Sa becomes greater, and the PFA crystals become smaller. Therefore, slippage of the recording medium can be better suppressed. Where the thickness is 10 μm or more, the PFA crystals become larger, so that the release property relative to toner can be better improved. The thickness of the surface layer is more preferably 15 μm to 30 μm. The thickness of the surface layer can be adjusted by changing the thickness of the PFA tube. A method for measuring the thickness of the surface layer will be described hereinbelow.

Electrophotographic Image Forming Apparatus

FIG. 1 is a cross-sectional view of a color electrophotographic printer, which is an example of an electrophotographic image forming apparatus (hereinafter also referred to as an "image forming apparatus") of the present embodiment, the view being taken along the transport direction of the recording material. In the present embodiment, the color electrophotographic printer is simply referred to as a "printer".

A printer 1 shown in FIG. 1 is equipped with image forming units 10 for each color of Y (yellow), M (magenta), C (cyan), and Bk (black). A photosensitive drum (photosensitive member) 11 is pre-charged by a charger 12. The photosensitive drum 11 is then exposed to light by a laser scanner 13, and an electrostatic latent image is formed. The electrostatic latent image is converted into a toner image by a developing device 14. The toner image on the photosensitive drum 11 is sequentially transferred by a primary transfer blade 17 to, for example, an intermediate transfer belt 31 which is an image bearing member. After the transfer, any toner remaining on the photosensitive drum 11 is removed by a cleaner 15. As a result, the surface of the photosensitive drum 11 becomes clean and is prepared for the next image formation.

Meanwhile, the recording material P is sent out one by one from a paper feed cassette 20 or a multi-paper feed tray 25 in the direction of an arrow 3 and fed into a registration roller pair 23. The registration roller pair 23 temporarily receives the recording material P and straightens it out if it is skewed. The registration roller pair 23 feed the recording material P between the intermediate transfer belt 31 and a secondary transfer roller 35 synchronously with the toner image on the intermediate transfer belt 31. The color toner image on the intermediate transfer belt is transferred to the recording material P by, for example, the secondary transfer roller 35 which is a transfer member. The toner image on the recording material P is then fixed to the recording material P by the fixing device 40 applying heat and pressure to the recording material P.

The electrophotographic image forming apparatus includes a fixing device 40. Next, the fixing device in the electrophotographic image forming apparatus will be described. The fixing device includes a fixing member and a pressure member disposed opposite the fixing member. FIG. 2 is a schematic diagram of the fixing device 40 and is an example of a film heating type heating device (tensionless type). The present embodiment uses such a heating device, but it is also possible to use a roller pair type or film type heating device.

Reference numeral 43 stands for a ceramic heater (hereinafter referred to as "heater") as a heating body. The heater 43 is basically composed of a long and thin ceramic substrate with a longitudinal direction perpendicular to the drawing, and an electrically-energized heat-generating resistor layer provided on the surface of the substrate. The heater 43 is a low-heat capacity heater that rises in temperature with a steep rise characteristic as a whole when the heat-generating resistor layer is energized. In addition, in this configuration, the energization region is switched according to the longitudinal width size of the recording material.

The electrophotographic member according to at least one aspect of the present disclosure can be used as, for example, a fixing member. The fixing member is, for example, a fixing film. The fixing film 41 is a cylindrical (endless) heat-resistant fixing member as a heating member that transmits heat and is loosely fitted on the outside of a support member (heater holder) including the heater 43. The structure of the fixing film 41 is as shown in FIG. 3 and is a fixing film configured of a three-layer composite structure including at least the surface layer 41*a*, the elastic layer 41*c*, and the base layer 41*b*.

The pressure roller 44 is a heat-resistant elastic pressure roller serving as a pressure member and has a core and an elastic layer made of heat-resistant rubber such as silicone rubber or fluororubber, or a silicone rubber foam. Both ends of the core are supported by bearings to enable free rotation. The electrophotographic member according to at least one aspect of the present disclosure can also be used as, for example, a pressure member. In other words, it is preferable that at least one of the fixing member and the pressure member be the electrophotographic member. For example, the pressure member can be configured similarly to the fixing film 41, and the pressure member can have a three-layer composite structure including the surface layer 41*a*, the elastic layer 41*c*, and the base layer 41*b*.

The fixing film 41 and the heater 43 are arranged parallel to the pressure roller 44 on the upper side of the pressure roller 44 and pressed by a pressing member (not shown). In this way, the lower surface of the heater 43 and the upper surface of the pressure roller 44 are pressed against each other, with the fixing film 41 interposed therebetween, against the elasticity of the elastic layer, thereby forming a fixing nip portion of a predetermined width as a heating portion.

The pressure roller 44 is driven by a driving means (not shown) to rotate at a predetermined rotational peripheral speed in the counterclockwise direction indicated by the arrow. A rotational force acts on the cylindrical fixing film 41 due to the frictional force of the pressure contact between the pressure roller 44 and the fixing film 41 at the fixing nip portion caused by the rotational drive of the pressure roller 44. The fixing film 41 then comes into a driven rotation state in the clockwise direction indicated by the arrow while sliding against the downward surface of the heater 43 in close contact therewith. The support member (heater holder) 46 also serves as a rotation guide member for the cylindrical fixing film 41.

The pressure roller 44 is driven to rotate, and the cylindrical fixing film 41 is driven to rotate accordingly. Furthermore, the heater 43 is energized, the heater temperature rises quickly to a predetermined temperature, and a temperature-regulated state is assumed. In this state, the recording material P bearing the unfixed toner image T is introduced between the fixing film 41 and the pressure roller 44 in the fixing nip portion. Then, in the fixing nip portion, the toner image-bearing side of the recording material P comes into close contact with the outer surface of the fixing film 41 and is sandwiched and transported to the fixing nip portion together with the fixing film 41. During this sandwiching and transportation process, the recording material P is heated by the heat of the fixing film 41 heated by the heater 43, and the unfixed toner image T on the recording material P is heated and pressurized onto the recording material P and melted and fixed. The recording material P that has passed through the fixing nip portion is separated from the surface of the fixing film 41 by curvature and is transported out.

Reference numeral 45 stands for a contact thermometer (thermistor) that is configured to measure the temperature of the fixing film 41 heated by the heater 43 and pass the detection result to a temperature control means (not shown). Reference numeral 46 stands for a heater holder that holds the heater 43 that generated high-temperature heat.

Methods for measuring physical properties in the present disclosure are described hereinbelow.

Method for Measuring Arithmetic-Mean Height Sa

A rectangular region having a length of 5 mm in a direction along the circumferential direction of the electrophotographic member and a length of 10 mm in a longitudinal direction perpendicular to the circumferential direction is arranged on the outer surface of the electrophotographic member so that the center of the rectangular region in the longitudinal direction coincides with the center of the electrophotographic member in the longitudinal direction. The rectangular area is measured using a shape analysis laser microscope (product name: VK-X150, manufactured by Keyence Corporation). Using the shape measurement mode, a 20× objective lens is used to obtain shape measurement images of the outermost surface of the surface layer. The obtained images are linked to obtain an image of the entire range within the rectangular area.

First, the surface shape correction of the image of the entire range within the obtained rectangular region is performed using the analysis software provided with the microscope. Quadratic surface correction is selected as the method of surface shape correction. The observation region is divided into 200 observation regions using squares with sides of 500 μm, and the arithmetic-mean height Sa of each observation region is calculated using an S filter of 8 μm and an L filter of 0.25 mm.

A frequency distribution of the observation regions is created using the calculated arithmetic-mean height Sa as a class with a class width of 0.05 μm. From this frequency distribution, an observation region group X1 belonging to a class where the arithmetic-mean height Sa is 0.10 μm to 0.40 μm, an observation region group X2 belonging to a class where the arithmetic-mean height Sa is 0.10 μm to 0.20 μm, and an observation region group X3 belonging to a class where the arithmetic-mean height Sa is 0.25 μm to 0.40 μm are obtained, and the values of x1, x2, and x3 are calculated.

Method for Measuring Area-Average Diameter of Crystals

First, the surface layer of the observation region is isolated. Specifically, the surface layer is peeled off together with the elastic layer from the base layer, and the elastic layer attached to the surface layer is dissolved with a solvent to isolate only the surface layer. The outer surface of the isolated surface layer is then observed with a microscope (product name: ECLIPSE LV100NDA, manufactured by Nikon Corporation) to obtain an observation image of the crystals in the entire range in the observation region. The observation conditions are to switch to transmitted illumination, orthogonally arrange the analyzer and the transmitted illumination polarizer to adjust to cross Nicols, and use a 20× objective lens. By using a transmitted polarizing microscope, an observation image that can confirm the crystal structure can be obtained.

Next, the outlines of the crystals in the entire range in the observation region are manually extracted from the obtained crystal observation image. The extraction conditions are that each crystal has a shadow in the form of a cross called a Maltese cross, and the boundary line of each Maltese cross in the observation image is extracted as the crystal outline. The area of each crystal is calculated using the image analysis software "ImageJ". The area-average diameter of the crystals in the observation region is calculated from the area of each crystal and the circle-equivalent diameter calculated from each area. The circle-equivalent diameter calculated here confirms that there is a plurality of crystals having different circle-equivalent diameters.

Furthermore, by performing the above operation on the observation regions included in the observation region group X2, the area-average diameter z2 of the crystals in the observation regions included in X2 is calculated.

Similarly, by performing the above operation on the observation regions included in the observation region group X3, the area-average diameter z3 of the crystals in the observation regions included in X3 is calculated.

Method for Measuring Difference Δt Between Maximum Value and Minimum Value of Arithmetic-mean Thickness of Surface Layer of All Observation Regions In the same manner as in the measurement of the arithmetic-mean height Sa, the rectangular region is measured using the shape analysis laser microscope (product name: VK-X150, manufactured by Keyence Corporation). Using the shape measurement mode, a 20× objective lens is used to obtain measurement images of the thickness of the transparent body. The obtained images are linked to obtain an image of the entire range within the rectangular region.

First, the surface shape correction of the image of the entire range within the obtained rectangular region is performed using the analysis software provided with the microscope. Quadratic surface correction is selected as the method of surface shape correction. The observation region is divided into 200 observation regions using squares with sides of 500 μm, and the arithmetic-mean thickness of each observation region is obtained. The obtained arithmetic-mean thickness is set as the arithmetic-mean thickness of the surface layer, and the difference Δt between the maximum arithmetic-mean thickness and the minimum arithmetic-mean thickness is obtained from 200 values of the arithmetic-mean thickness.

Method for Measuring Thickness of Surface Layer

First, the surface layer is isolated from the electrophotographic member in the same manner as in the measurement of the area-average diameter of the crystals described above. Then, the thickness of a freely selected part of the isolated surface layer is measured using a micrometer (product name: High-precision digital micrometer MDH-25 MB, manufactured by Mitutoyo Corporation).

EXAMPLES

The present disclosure will be described in greater detail below using Examples and Comparative Examples, but the aspects of the present disclosure are not limited to these.

Example 1

In this Example, a fixing film as shown in FIG. 3 was prepared.

Inner Surface Treatment of PFA Tube

A PFA tube having a thickness of 20 μm was used that was obtained by extrusion molding using Neoflon PFA:AP-231SH (manufactured by Daikin Industries, Ltd.) as a raw material. An aqueous solution adjusted to contain 5% by mass of sodium benzoate and 1% by mass of Surflon S-113 (fluorosurfactant, manufactured by AGC Seimi Chemical Co., Ltd.) was applied to the entire inner surface of the PFA tube and allowed to dry naturally. After that, irradiation was performed with a KrF excimer laser beam of 250 $mJ/cm^2$/pulse. At this time, the irradiation conditions were adjusted so that within a range of 5 mm in the circumferential direction and 10 mm in the longitudinal direction of the inner surface of the PFA tube, the region irradiated with 8 shots and the region irradiated with 4 shots were present in an area ratio of 50:50. In this way, a PFA tube subjected to inner surface treatment was obtained.

Base Layer

Stainless steel SUS with an inner diameter of 24 mm and a thickness of 30 μm was used as the base layer.

Formation of Inner Sliding Layer

First, an aromatic tetracarboxylic acid dianhydride or a derivative thereof and an aromatic diamine were reacted in approximately equimolar amounts in an aprotic polar organic solvent to obtain a polyimide precursor solution. The obtained polyimide precursor solution was applied to the inner peripheral surface of the base layer by a ring coating method, and after drying the solvent in an electric furnace, the inner sliding layer was formed by heating at a temperature of 260° C. to 400° C. for about 1 h. The thickness of the inner sliding layer was set to 12 μm.

Formation of Primer Layer and Elastic Layer

A primer layer and an elastic layer were formed by the following procedure on the base layer with the inner sliding layer formed thereon.

A hydrosilyl silicone primer (DY39-051 A/B; manufactured by Dow Toray Co., Ltd.) was applied to the base layer and heated and cured at 200° C. for 5 min. A liquid addition-curable silicone rubber composition made by mixing the following components (a) to (d) was applied to a thickness of 250 μm onto the primer layer and heat-cured at 200° C. for 30 min to form a silicone rubber elastic layer with a thickness of 250 μm.

Silicone Rubber Composition

- Component (a): linear chain type organopolysiloxane having an unsaturated aliphatic group;
- Component (b): organopolysiloxane having active hydrogen bonded to silicon;
- Component (c): catalyst;
- Component (d): thermally conductive filler First, 100 parts by mass of a silicone polymer having vinyl groups, which are unsaturated aliphatic groups, only at both ends of the molecular chain, and methyl groups as unsubstituted hydrocarbon groups that do not contain any other unsaturated aliphatic group, was prepared as component (a). This silicone polymer (product name: DMS-V35, manufactured by Gelest, Inc., viscosity 5000 $mm^2/s$) will be referred to as "Vi" hereafter.

Next, 370 parts by mass of alumina (product name: Alunabeads CB-P10, manufactured by Showa Denko K.K.) was added to this Vi as component (d), and the mixture was set in a planetary mixer (ARV-5000, manufactured by Thinky Corporation) and stirred and mixed at 600 rpm for 2 min to obtain mixture 1.

Next, 0.2 parts by mass of 1-ethynyl-1-cyclohexanol (manufactured by Tokyo Chemical Industry Co., Ltd.) dissolved as a curing retarder in the same weight of toluene was added to mixture 1 to obtain mixture 2.

Next, 0.1 parts by mass of a hydrosilylation catalyst (platinum catalyst: a mixture of 1,3-divinyltetramethyldisiloxane platinum complex, 1,3-divinyltetramethyldisiloxane, and 2-propanol) was added as component (c) to mixture 2 to obtain mixture 3.

Furthermore, 1.1 parts by mass of a silicone polymer with a linear siloxane skeleton and silicon-bonded active hydrogen groups only on the side chains (product name: HMS-301, manufactured by Gelest, Inc., viscosity 30 $mm^2/s$, hereafter referred to as "SiH") was weighed out as component (b). This was added to mixture 3 and thorough mixing was performed to obtain a liquid addition-curable silicone rubber composition.

Application of Adhesive Layer

After forming the elastic layer, an adhesive (SE1819CV A/B; equal amounts of "A liquid" and "B liquid" manufactured by Dow Toray Co., Ltd.) was applied to the elastic layer to a thickness of 7 μm using the ring coating method.

Formation of Surface Layer

After applying the adhesive, the PFA tube subjected to the above-mentioned inner surface treatment was applied as the surface layer to the adhesive by a method of vacuum expansion and covering from the outside (vacuum expansion and covering method). Specifically, the PFA tube was vacuum-attached to the inner surface of an outer tube with an inner diameter larger than the outer diameter of the workpiece after the elastic layer coated with the adhesive was formed thereon, and the PFA tube was expanded in diameter. The workpiece was inserted into the expanded PFA tube, and then the vacuum was released to cover the adhesive. The excess adhesive and air between the PFA tube and the elastic layer were removed with an O-ring or the like, and the adhesive was cured using a heating means such as an electric furnace to cause bonding. Specifically, the heating was conducted at 200° C. for 2 min using an electric furnace. Then, both ends were cut to the desired length (336.5 mm).

Heat Treatment of Surface Layer

After cutting both ends to the desired length, the film was inserted into a heating tube with an inner diameter of φ42 mm, and the entire area was heat-treated by a band heater inside the heating tube. The heating temperature was 330° C., and the heat treatment was performed so that the actual temperature of the surface layer was equal to or higher than the melting temperature of PFA.

The heating time was set to 3 min after the fixing film was placed in the heating tube, which was the time during which the actual temperature of the surface layer could reach the desired heat treatment temperature. After 3 min had passed since the placement, the heating tube was cooled to 200° C. at a rate of 60° C./min. Then, the film was taken out of the heating tube into a room temperature (25° C.) atmosphere to obtain a fixing film.

The values of x1, x2, x3, and Δt of the prepared fixing film were obtained by the above-mentioned methods. In addition, the value of the area-average diameter of the crystals was obtained for each of the observation regions included in X2 and X3. In addition, two observation regions were extracted from each of X2 and X3, for a total of four observation regions, Sa and the area-average diameter of the crystals were calculated for each observation region, and the correlation coefficient R between Sa and the area-average diameter of each observation region was obtained. These results are shown in Table 1.

Evaluation of Toner Release Property after Passage of 20,000 Sheets of Paper

The evaluation of toner release property after the passage of 20,000 sheets of paper was performed using the film heating type fixing device 40 shown in FIG. 2, which incorporated the produced fixing film, and the evaluation of hot offset resistance described below.

First, the pressure roller was driven to rotate so that the moving speed (circumferential speed) of the pressure roller surface was 300 mm/see, with the pressure force at one end set to 156.8 N and the total pressure force set to 313.6 N (32 kgf), and 20,000 sheets of paper (A4 landscape, GF-C068) were continuously passed in a state in which the surface temperature of the paper passing part of the fixing film was controlled to 170° C.

Then, hot offset resistance was evaluated under the following conditions.

Evaluation paper: CS-064 (64.0 g/$m^2$)

(sold by Canon Marketing Japan Inc.)

Toner laid-on level on evaluation paper: 0.08 mg/$cm^2$ (adjusted by DC voltage VDC of developer carrying member, charging voltage VD of electrostatic latent image bearing member, and laser power)

Evaluation image: a 2 cm×20 cm image was placed on the long edge of the A4 paper in the paper passing direction with a margin of 2 mm from the leading edge of the paper.

Test environment: normal temperature and low-humidity environment: temperature 23° C./humidity 5% RH (hereinafter referred to as "N/L")

Pressure: 300 N

Process speed: 300 mm/sec

Fixation temperature: 210° C.

The above evaluation image was output, and the average reflectance Dr (%) of the evaluation paper before the image output and the reflectance Ds (%) of the white background after the fixing test were measured using a reflectometer (REFLECTOMETER MODEL TC-6DS: manufactured by Tokyo Denshoku Co., Ltd.), and the fogging was calculated using the following formula. The obtained fogging was evaluated according to the following evaluation criteria and used as an evaluation of hot offset resistance. A good evaluation of hot offset resistance indicates good toner release property after 20,000 sheets have passed.

$$\text{Fogging}(\%) = Dr(\%) - Ds(\%)$$

Evaluation Criteria

A: less than 0.2%

B: 0.2% or more, less than 0.5%

C: 0.5% or more, less than 1.0%

D: 1.0% or more

Evaluation of Image Quality

Evaluation of image quality was performed by comparing the thickness of thin lines using a film heating type fixing device 40 similar to that used in the evaluation of toner release property.

An image (printed area ratio 4%) in which a grid pattern with a line width of 3 pixels was printed on the entire surface of an A4 sheet of paper was printed. The theoretical line width of 3 pixels is 127 μm. The line width of the image was measured with a microscope VK-8500 (manufactured by Keyence Corporation). Five points were randomly selected from the lines that passed so that they were parallel to the longitudinal direction of the fixing film, and the line width was measured. The average value of the three points excluding the minimum and maximum values was taken as d (μm). L was then calculated using the following formula.

$$L(\mu m) = d - 127$$

The value of L was evaluated according to the following evaluation criteria to evaluate the image quality. The toner melts and spreads in the paper passage direction due to the slippage of the paper during fixing, so the value of d becomes larger. Therefore, the more the slippage of the paper is suppressed, the smaller the value of L becomes.

Evaluation Criteria

A: less than 5 μm

B: 5 μm or more and less than 10 μm

C: 10 μm or more and less than 20 μm

D: 20 μm or more

Example 2

A fixing film was obtained in the same manner as in Example 1, except that the cooling rate of the heating tube was changed to 40° C./min during the heat treatment of the surface layer.

Example 3

A fixing film was obtained in the same manner as in Example 1, except that the cooling rate of the heating tube was changed to 30° C./min during the heat treatment of the surface layer.

Example 4

In the treatment of the inner surface of the PFA tube, the irradiation conditions were changed so that within a range of 5 mm in a direction along the circumferential direction and 10 mm in the longitudinal direction of the inner surface of the PFA tube, the area ratio of the region irradiated with 8 shots and the region irradiated with 4 shots of KrF excimer laser light was 75:25. Then, when cutting both ends to the desired length (336.5 mm), the cutting positions of both ends were adjusted to satisfy the following conditions.

Thus, the cutting positions of both ends were adjusted so that when a rectangular area with a length of 5 mm in a direction along the circumferential direction of the fixing film and a length of 10 mm in the longitudinal direction perpendicular to the circumferential direction was arranged so that the center of the rectangular region in the longitudinal direction coincided with the center of the electrophotographic member in the longitudinal direction, and the rectangular area was divided into 200 observation regions by squares with sides of 500 μm, the boundary between the region irradiated with 8 shots and the region irradiated with 4 shots of KrF excimer laser light coincided with the boundary line of the observation region in the inner surface treatment of PFR tube.

Apart from above, a fixed film was obtained in the same manner as in Example 1.

Example 5

A fixed film was obtained in the same manner as in Example 4, except that the irradiation conditions were changed in the treatment of the inner surface of the PFA tube so that within a range of 5 mm in the circumferential direction and 10 mm in the longitudinal direction of the PFA tube, the region irradiated with 8 shots and the region irradiated with 4 shots of KrF excimer laser light were present in an area ratio of 25:75.

Example 6

A fixed film was obtained in the same manner as in Example 4, except that the irradiation conditions were changed in the treatment of the inner surface of the PFA tube so that within a range of 5 mm in the circumferential direction and 10 mm in the longitudinal direction of the PFA tube, the region irradiated with 8 shots and the region irradiated with 4 shots of KrF excimer laser light were present in an area ratio of 70:30.

Example 7

A fixed film was obtained in the same manner as in Example 4, except that in the treatment of the inner surface of the PFA tube, the irradiation conditions were changed so that within a range of 5 mm in the circumferential direction and 10 mm in the longitudinal direction of the PFA tube, the region irradiated with 8 shots and the region irradiated with 4 shots of KrF excimer laser light were present in an area ratio of 30:70.

Example 8

A fixed film was obtained in the same manner as in Example 1, except that the thickness of the PFA tube was changed to 10 μm.

Example 9

A fixed film was obtained in the same manner as in Example 1, except that the thickness of the PFA tube was changed to 30 μm.

Example 10

A fixed film was obtained in the same manner as in Example 1, except that the thickness of the PFA tube was changed to 8 μm.

Example 11

A fixed film was obtained in the same manner as in Example 1, except that the thickness of the PFA tube was changed to 40 μm.

Comparative Example 1

In the treatment of the inner surface of the PFA tube, the irradiation conditions were changed so that the entire area was irradiated with 10 shots of KrF excimer laser light. In addition, after the heat treatment of the surface layer, the fixing film was rotated while being pressed with a pressure of 50 N against a surface transfer member heated to 350° C., and surface transfer treatment was performed. As the surface transfer member, a stainless steel member was used in which, within an area of 5 mm in the circumferential direction and 10 mm in the longitudinal direction of the outer surface of the surface layer, the region with an arithmetic-mean height Sa of 0.15 μm and the region with an arithmetic-mean height Sa of 0.35 μm were present at an area ratio of 50:50.

Apart from the above, a fixing film was obtained in the same manner as in Example 1.

Comparative Example 2

A fixed film was obtained in the same manner as in Example 1, except that in the treatment of the inner surface of the PFA tube, the irradiation conditions were changed so that the entire area was irradiated with two shots of KrF excimer laser light.

Comparative Example 3

A fixed film was obtained in the same manner as in Example 1, except that in the treatment of the inner surface of the PFA tube, the irradiation conditions were changed so that the region irradiated with 10 shots and the region irradiated with 5 shots of KrF excimer laser light were present with an area ratio of 50:50, and in the heat treatment of the surface layer, the cooling rate of the heating tube was changed to 20° C./min.

Comparative Example 4

A fixed film was obtained in the same manner as in Example 1, except that in the heat treatment of the surface layer, the cooling rate of the heating tube was changed to 5° C./min.

Comparative Example 5

A fixed film was obtained in the same manner as in Example 4, except that in the treatment of the inner surface of the PFA tube, the irradiation conditions were changed so that within a range of 5 mm in the circumferential direction and 10 mm in the longitudinal direction of the PFA tube, the region irradiated with 8 shots and the region irradiated with 4 shots of KrF excimer laser light were present in an area ratio of 80:20.

Comparative Example 6

A fixed film was obtained in the same manner as in Example 4, except that in the treatment of the inner surface of the PFA tube, the irradiation conditions were changed so that within a range of 5 mm in the circumferential direction and 10 mm in the longitudinal direction of the PFA tube, the region irradiated with 8 shots and the region irradiated with 4 shots of KrF excimer laser light were present in an area ratio of 20:80.

The physical properties and evaluation results of the fixing films of Examples 2 to 11 and Comparative Examples 1 to 6 are shown in Table 1.

In addition, in Example 2, the number y2 of observation regions included in the observation region group Y2 belonging to a class where Sa was greater than 0.40 μm was 19. In Example 3, the number y2 of observation regions included in the observation region group Y2 belonging to a class where Sa was greater than 0.40 μm was 40. In Comparative Example 3, the number y1 of observation regions included in the observation region group Y1 belonging to a class where Sa was less than 0.10 μm was 48. In Comparative Example 4, the number y2 of observation regions included in the observation region group Y2 belonging to a class where Sa was greater than 0.40 μm was 47.

TABLE 1

| | Correlation coefficient | | | | | | Area-average diameter | | Δt | Thickness | Evaluation | |
|---|---|---|---|---|---|---|---|---|---|---|---|---|
| | | | | | | | | | | | Toner release property after passage of 20,000 shots | Image |
| | R | x1 | x2 | x3 | x2/x1 | x3/x1 | z2 | z3 | [μm] | [μm] | of paper | quality |
| Example 1 | 0.98 | 200 | 72 | 85 | 0.36 | 0.43 | 17.8 | 43.0 | 0.90 | 20 | A | A |
| Example 2 | 0.99 | 181 | 69 | 65 | 0.38 | 0.36 | 19.5 | 46.4 | 1.00 | 20 | A | B |
| Example 3 | 0.98 | 160 | 70 | 46 | 0.44 | 0.29 | 19.8 | 51.4 | 1.10 | 20 | A | C |
| Example 4 | 0.98 | 200 | 150 | 50 | 0.75 | 0.25 | 17.5 | 35.3 | 0.90 | 20 | C | A |
| Example 5 | 0.98 | 200 | 50 | 150 | 0.25 | 0.75 | 10.2 | 44.7 | 0.90 | 20 | A | C |
| Example 6 | 0.98 | 200 | 140 | 60 | 0.70 | 0.30 | 19.6 | 41.3 | 0.90 | 20 | B | A |
| Example 7 | 0.98 | 200 | 60 | 140 | 0.30 | 0.70 | 16.1 | 48.0 | 0.90 | 20 | A | B |
| Example 8 | 0.99 | 200 | 80 | 73 | 0.40 | 0.37 | 11.1 | 36.3 | 0.60 | 10 | A | A |
| Example 9 | 0.98 | 200 | 70 | 85 | 0.35 | 0.43 | 18.0 | 48.1 | 1.00 | 30 | A | A |
| Example 10 | 0.98 | 200 | 83 | 65 | 0.42 | 0.33 | 10.1 | 35.4 | 0.50 | 8 | B | A |
| Example 11 | 0.99 | 200 | 60 | 86 | 0.30 | 0.43 | 24.5 | 56.4 | 1.00 | 40 | A | B |
| C.E. 1 | 0.41 | 200 | 70 | 86 | 0.35 | 0.43 | 10.2 | 10.1 | 1.00 | 20 | D | A |
| C.E. 2 | — | 200 | 0 | 200 | 0.00 | 1.00 | — | 56.5 | 0.70 | 20 | A | D |
| C.E. 3 | 0.98 | 152 | 46 | 50 | 0.30 | 0.33 | 10.1 | 38.8 | 1.00 | 20 | D | A |
| C.E. 4 | 0.98 | 153 | 65 | 47 | 0.42 | 0.31 | 20.7 | 53.1 | 1.10 | 20 | A | D |
| C.E. 5 | 0.99 | 200 | 160 | 40 | 0.80 | 0.20 | 18.0 | 44.3 | 0.90 | 20 | D | A |
| C.E. 6 | 0.99 | 200 | 40 | 160 | 0.20 | 0.80 | 17.5 | 44.5 | 0.90 | 20 | A | D |

In the table, x1 indicates the number of the observation regions included in the observation region group X1, x2 indicates the number of the observation regions included in the observation region group X2, x3 indicates the number of the observation regions included in the observation region group X3, z2 indicates the area-average diameter (μm) of crystals in at least one observation region among the observation regions included in the observation region group X2, z3 indicates the area-average diameter (μm) of crystals in at least one observation region among the observation regions included in the observation region group X3, Δt indicates the difference between the maximum value of the arithmetic-mean thickness and the minimum value of the arithmetic-mean thickness when the arithmetic-mean thickness of the surface layer of 200 observation regions is determined, and C. E. indicates Comparative Example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-014989, filed Feb. 2, 2024 which is hereby incorporated by reference herein in its entirety.

What is claimed is:

1. An electrophotographic member comprising a base layer, an elastic layer on an outer peripheral surface of the base layer, and a surface layer on an outer peripheral surface of the elastic layer, wherein the surface layer comprises a tetrafluoroethylene-perfluoroalkyl vinyl ether copolymer, a plurality of crystals of the tetrafluoroethylene-perfluoroalkyl vinyl ether copolymer having different circle-equivalent diameters is exposed on an outer surface of the surface layer, at least a part of an outer surface of the electrophotographic member is composed of a surface of the crystals and is roughened by the crystals, when a rectangular region having a length of 5 mm in a direction along a circumferential direction of the electrophotographic member and a length of 10 mm in a longitudinal direction perpendicular to the circumferential direction is arranged on the outer surface of the electrophotographic member so that a center of the rectangular region in the longitudinal direction coincides with a center of the electrophotographic member in the longitudinal direction, the rectangular region is divided into 200 observation regions by squares with sides of 500 μm, and an arithmetic-mean height Sa of each observation region is determined, in a frequency distribution of the observation regions in which the arithmetic-mean height Sa is taken as a class and a class width is 0.05 μm, where the number of the observation regions comprised in an observation region group X1 belonging to a class where the arithmetic-mean height Sa is 0.10 to 0.40 μm is denoted by x1, x1 satisfies 160≤x1≤200, and where the number of the observation regions comprised in an observation region group X2 belonging to a class where the arithmetic-mean height Sa is 0.10 to 0.20 μm is denoted by x2, and the number of the observation regions comprised in an observation region group X3 belonging to a class where the arithmetic-mean height Sa is 0.25 to 0.40 μm is denoted by x3, x1 and x2 satisfy a following formula (1), and x1 and x3 satisfy a following formula (2):

$$0.25 \cdot x1 \leq x2 \leq 0.75 \cdot x1 \quad (1)$$

$$0.25 \cdot x1 \leq x3 \leq 0.75 \cdot x1. \quad (2)$$

2. The electrophotographic member according to claim 1, wherein x1 and x2 satisfy a following formula (3), and x1 and x3 satisfy a following formula (4):

$$0.30 \cdot x1 \leq x2 \leq 0.70 \cdot x1 \quad (3)$$

$$0.30 \cdot x1 \leq x3 \leq 0.70 \cdot x1. \quad (4)$$

3. The electrophotographic member according to claim 1, wherein an area-average diameter z2 of the crystals in at least one observation region among the observation regions comprised in the observation region group X2 is 10.0 to 25.0 μm.

4. The electrophotographic member according to claim 1, wherein an area-average diameter z3 of the crystals in at least one observation region among the observation regions comprised in the observation region group X3 is 35.0 to 60.0 μm.

5. The electrophotographic member according to claim 1, wherein, when an arithmetic-mean thickness of the surface layer in the 200 observation regions is determined, a difference Δt between a maximum value of the arithmetic-mean thickness and a minimum value of the arithmetic-mean thickness is 2.00 μm or less.

6. The electrophotographic member according to claim 1, wherein a thickness of the surface layer is 10 to 30 μm.

7. The electrophotographic member according to claim 1, wherein the electrophotographic member is an electrophotographic belt having an endless shape.

8. The electrophotographic member according to claim 7, wherein the electrophotographic member is a fixing belt.

9. A fixing device in an electrophotographic image forming apparatus, wherein the fixing device comprises a fixing member and a pressure member arranged opposite the fixing member, and at least one of the fixing member and the pressure member is the electrophotographic member according to claim 1.

10. An electrophotographic image forming apparatus comprising a fixing device, wherein the fixing device comprises a fixing member and a pressure member arranged opposite the fixing member, and at least one of the fixing member and the pressure member is the electrophotographic member according to claim 1.

* * * * *